United States Patent
Liu et al.

(10) Patent No.: US 10,354,361 B2
(45) Date of Patent: Jul. 16, 2019

(54) IMAGE STITCHING METHOD AND CAMERA SYSTEM WITH AN IMAGE STITCHING FUNCTION

(71) Applicant: VIVOTEK INC., New Taipei (TW)

(72) Inventors: Cheng-Chieh Liu, New Taipei (TW);
Wei-Ming Liu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 241 days.

(21) Appl. No.: 15/350,098

(22) Filed: Nov. 13, 2016

(65) Prior Publication Data

US 2017/0148138 A1    May 25, 2017

(30) Foreign Application Priority Data

Nov. 20, 2015  (TW) .............................. 104138492 A

(51) Int. Cl.
| | |
|---|---|
| *G06T 3/40* | (2006.01) |
| *H04N 5/232* | (2006.01) |
| *H04N 5/247* | (2006.01) |
| *H04N 7/18* | (2006.01) |
| *G06T 7/33* | (2017.01) |

(52) U.S. Cl.
CPC .............. *G06T 3/4038* (2013.01); *G06T 7/33* (2017.01); *H04N 5/23238* (2013.01); *H04N 5/247* (2013.01); *H04N 7/181* (2013.01); *G06T 2200/32* (2013.01); *G06T 2207/30232* (2013.01)

(58) Field of Classification Search
CPC .... H04N 5/23238; H04N 5/247; H04N 5/265; H04N 13/243; H04N 13/282; G06T 3/4038; G06T 2207/20221; G06T 3/0093; G06T 1/0007; G03B 37/00; G02B 13/06; B60R 2300/303; B60R 2300/10
See application file for complete search history.

(56) References Cited

U.S. PATENT DOCUMENTS

| | | | |
|---|---|---|---|
| 2010/0054628 A1* | 3/2010 | Levy ..................... | G06T 3/4038 382/284 |
| 2010/0128789 A1* | 5/2010 | Sole ........................ | G06T 5/005 375/240.16 |
| 2015/0178884 A1* | 6/2015 | Scholl ................... | G06T 3/0018 348/36 |

* cited by examiner

*Primary Examiner* — Clifford Hilaire
(74) *Attorney, Agent, or Firm* — Winston Hsu

(57) ABSTRACT

An image stitching method is applied to a camera system with an image stitching function, so as to combine monitoring images captured from different view angles. The camera system includes two image capturing units respectively having a first coordinate system and a second coordinate system, and monitoring regions of the two image capturing units are adjacent and include an overlapped monitoring region. The image stitching method includes detecting at least one moving object within the overlapped monitoring region, calculating at least one set of transforming parameters of the first coordinate system relative to the second coordinate system, acquiring a reliability level according to comparison result generated by mutual comparisons between several sets of transforming parameters and then further comparing with a threshold respectively, determining a final transform parameter by the reliability level, and utilizing the final transform parameter to stitch the monitoring images captured by the two image capturing units.

16 Claims, 7 Drawing Sheets

I3

IMAGE STITCHING METHOD AND CAMERA SYSTEM WITH AN IMAGE STITCHING FUNCTION

BACKGROUND OF THE INVENTION

1. Field of the Invention

The present invention relates to an image stitching method and a camera system with an image stitching function, and more particularly, to an image stitching method and a camera system with an image stitching function for combining monitoring images of independent image capturing units with each other.

2. Description of the Prior Art

The monitoring camera has widespread applications and can be installed on an entrance of building, such as a factory, a dormitory, a store, a building and a residence house, or on a road where few people tread. The monitoring camera can record and store surrounding image for someday investigation or verification. However, a view range of the monitoring camera is limited, and the plurality of monitoring cameras respectively capturing different monitoring regions is combined and applied for the wider monitoring region, to prevent missing any suspicious event inside the monitoring region. In addition, the view ranges of the plurality of cameras are overlapped to ensure that there has no blind spot on the monitoring image.

Images captured by the plurality of cameras can be linked to generate a panoramic image for visual observation, and design of an image stitching method capable of accurately linking the image with different visual angles captured by different cameras and effectively avoiding image dislocation is an important issue in the monitoring industry.

SUMMARY OF THE INVENTION

The present invention provides an image stitching method and a camera system with an image stitching function for combining monitoring images of independent image capturing units with each other for solving above drawbacks.

According to the claimed invention, an image stitching method applied to two image capturing units respectively having a first coordinate system and a second coordinate system is disclosed. The two image capturing units have monitoring regions adjacent to each other and an overlapped monitoring region is formed by the said monitoring regions. The image stitching method includes detecting at least one moving object within the overlapped monitoring region, calculating at least one transforming parameter of the first coordinate system relative to the second coordinate system, acquiring a reliability level according to a comparison result between the at least one transforming parameter and a threshold, determining a final transform parameter in accordance with the reliability level, and utilizing the final transform parameter to stitch monitoring images respectively captured by the two image capturing units.

According to the claimed invention, a camera system with an image stitching function is disclosed. The camera system has an operation processing unit and two image capturing units electrically connected with each other, the two image capturing units respectively have a first coordinate system and a second coordinate system, the two image capturing units have monitoring regions adjacent to each other and an overlapped monitoring region is formed by the said monitoring regions. The operation processing unit is utilized to detect at least one moving object within the overlapped monitoring region, to calculate at least one transforming parameter of the first coordinate system relative to the second coordinate system, to acquire a reliability level according to a comparison result between the at least one transforming parameter and a threshold, to determine a final transforming parameter in accordance with the reliability level, and to utilize the final transform parameter to stitch monitoring images respectively captured by the two image capturing units.

The image stitching method and the camera system with the image stitching function of the present invention dispose the two image capturing units adjacent to each other by letting the monitoring regions overlapped, the coordinate values of the moving object (which can be represented as a reference point) inside the overlapped monitoring region are utilized to calculate and generalize the final transforming parameter mostly suitable for transformation between the two coordinate systems, and the monitoring images respectively captured by the two image capturing units are stitched up via the final transforming parameter to provide the panoramic stitching image. The stitching image further can be enhanced by the manners of utilizing the feature point or the straight baseline to increase stitching accuracy, and the user can conveniently issue the command over the stitching image by visual observation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
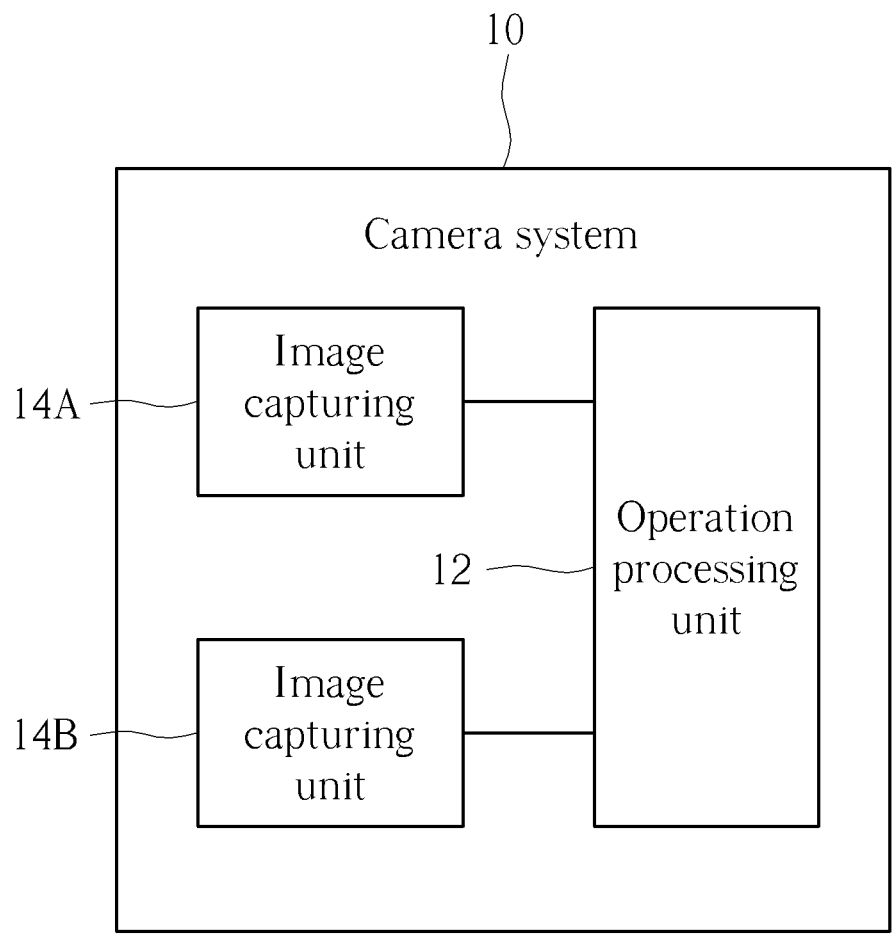
FIG. 1 is a functional block diagram of a camera system according to an embodiment of the present invention.
Figure 2:
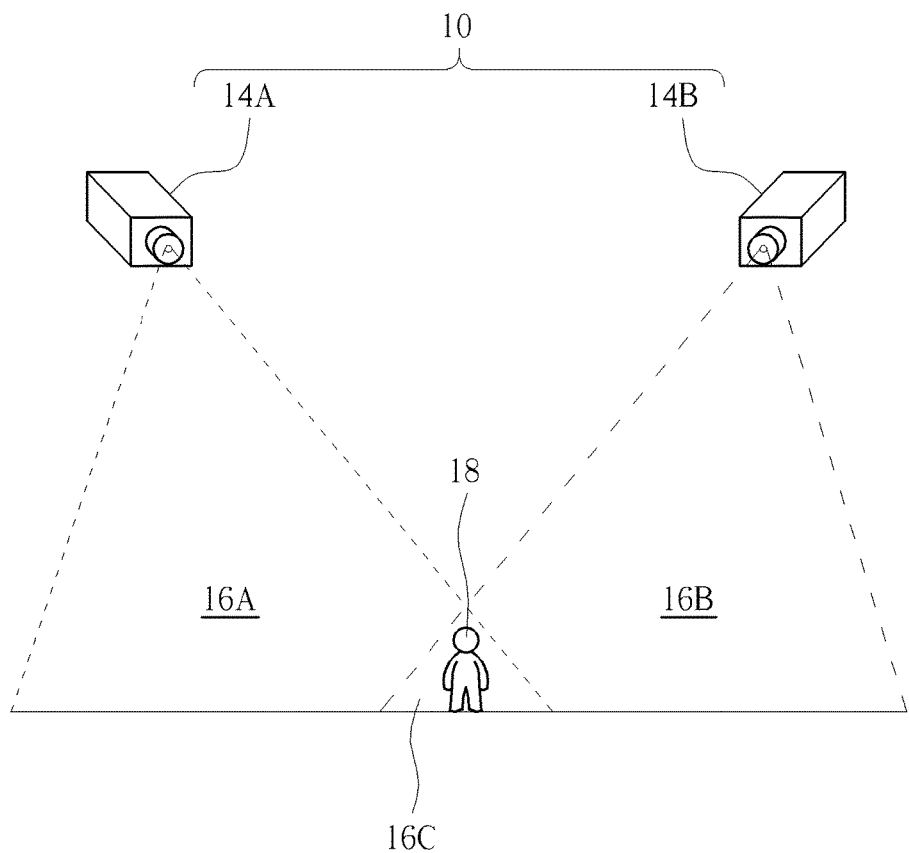
FIG. 2 is an assembly diagram of the camera system according to the embodiment of the present invention.

Please refer to FIG. 1 and FIG. 2. FIG. 1 is a functional block diagram of a camera system 10 according to an embodiment of the present invention. FIG. 2 is an assembly diagram of the camera system 10 according to the embodiment of the present invention. The camera system 10 includes an operation processing unit 12 and a plurality of image capturing units 14A, 14B electrically connected with each other. The camera system 10 in this embodiment has two image capturing units 14A, 14B, and an actual application may have more image capturing units in accordance with design demand. As shown in FIG. 2, while the monitoring environment is greater than the monitoring range of the image capturing unit 14A or 14B, the image capturing unit 14A and the image capturing unit 14B are respectively disposed to opposite sides of the monitoring environment, a monitoring region 16A of the image capturing unit 14A is adjacent to and partially overlapped with a monitoring region 16B of the image capturing unit 14B, and an overlapped monitoring region 16C is formed accordingly. A combination of the monitoring regions 16A, 16B is able to contain the whole monitoring environment. The image capturing unit 14A and the image capturing unit 14B respectively capture monitoring images from different angles of the moving object 18, which means each monitoring image covers the related monitoring region, and the image stitching method of the present invention can be executed to stitch the monitoring images with different view angles.

Figure 3:
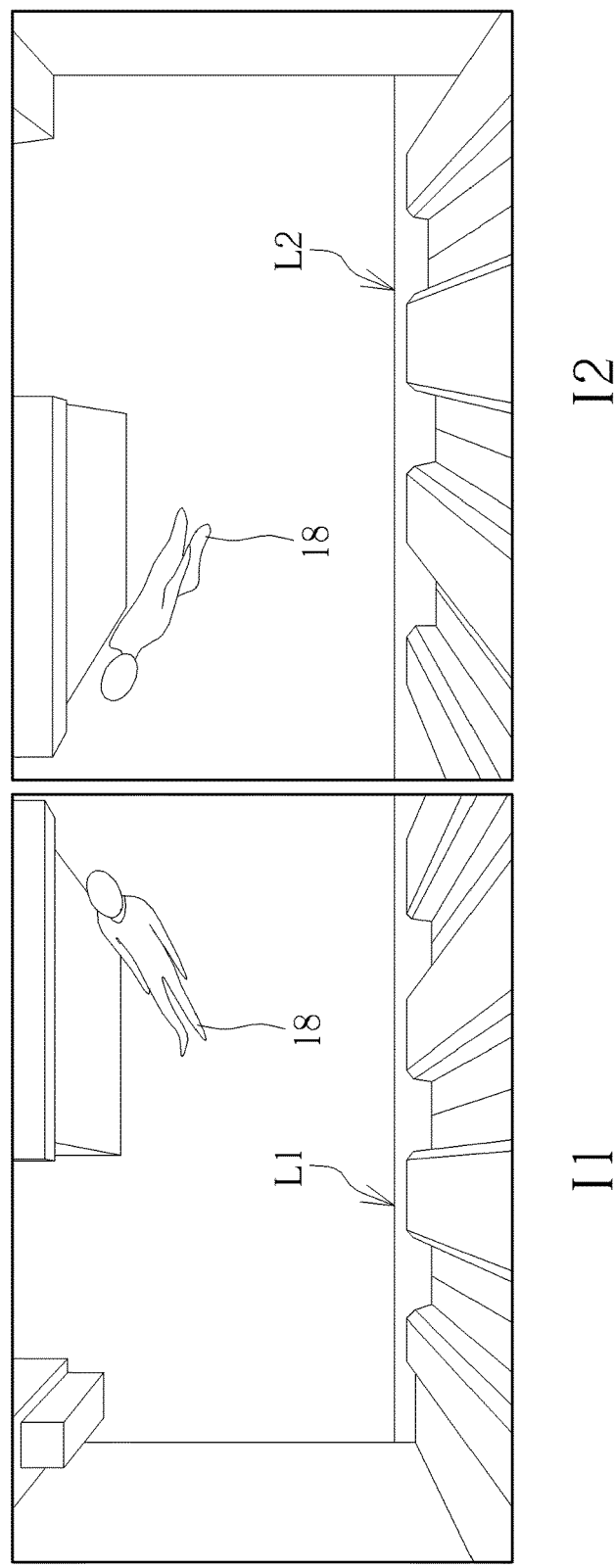
FIG. 3 is a diagram of the monitoring images with different view angles captured by the camera system according to the embodiment of the present invention.
Figure 4:
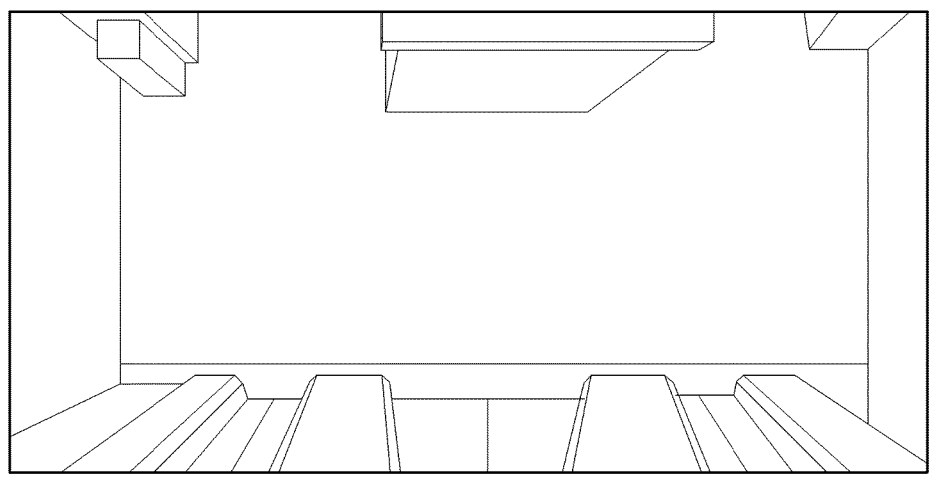
FIG. 4 is a diagram of a stitching image formed by an image stitching function of the camera system according to the embodiment of the present invention.
Figure 5:
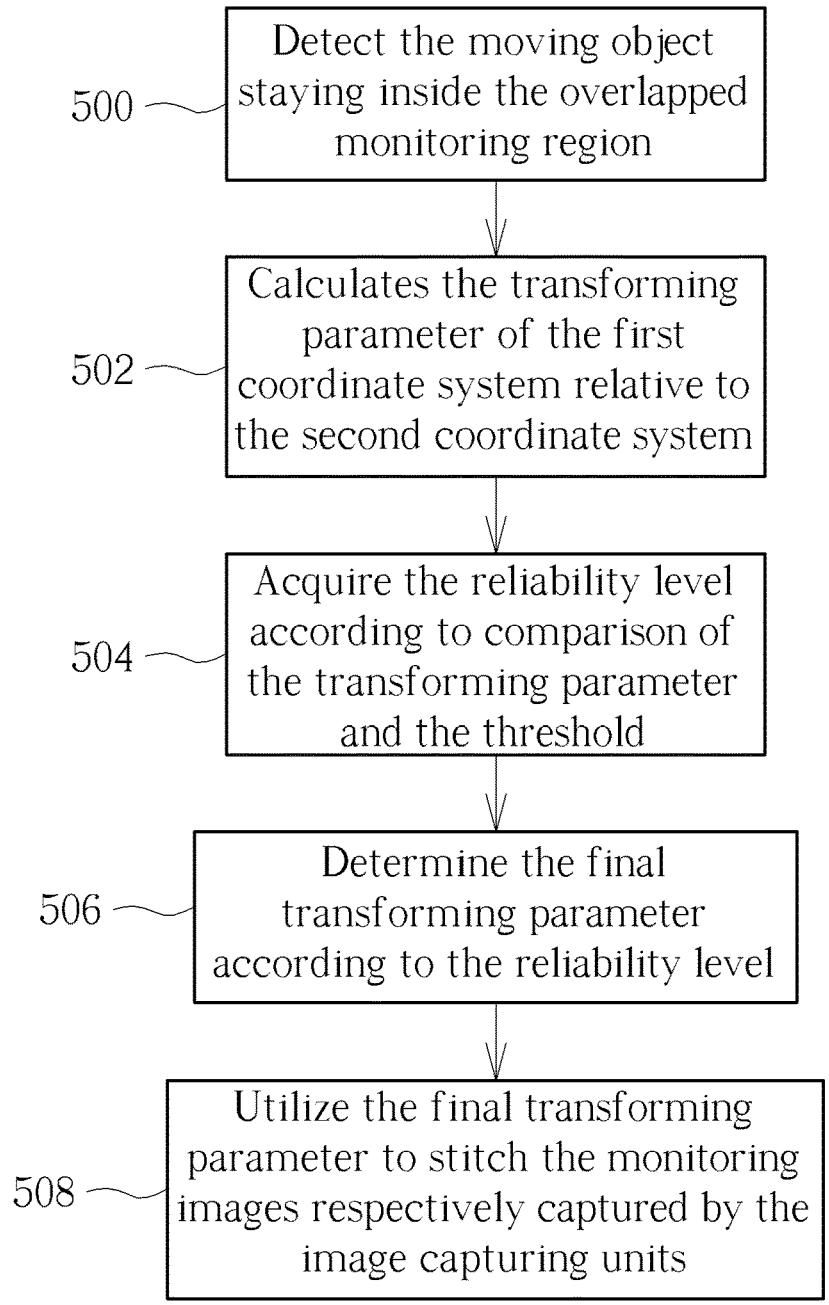
FIG. 5 is a flow chart of an image stitching method according to the embodiment of the present invention.

Please refer to FIG. 2 to FIG. 5. FIG. 3 is a diagram of the monitoring images with different view angles captured by the camera system 10 according to the embodiment of the present invention. FIG. 4 is a diagram of a stitching image I3 formed by an image stitching function of the camera system 10 according to the embodiment of the present invention. FIG. 5 is a flowchart of an image stitching method according to the embodiment of the present invention. The image capturing unit 14A and the image capturing unit 14B simultaneously capture the first monitoring image I1 and the second monitoring image I2, to acquire action information (such as a stay point, a shift distance and a moving direction) of a moving object 18 within the overlapped monitoring region 16C. The image capturing units 14A, 14B are located at different positions, and a first coordinate system of the first monitoring image I1 is different from a second coordinate system of the second monitoring image I2. An amount of the moving object 18 is not limited to the embodiment shown in FIG. 2, which depends on actual demand.

According to the said image stitching method, step 500 is executed to detect the moving object 18 staying inside or passing through the partial overlapped region (which means the said overlapped monitoring region 16C) between the adjacent monitoring regions 16A, 16B; the image capturing unit 14A and the image capturing unit 14B respectively capture the first monitoring image I1 and the second monitoring image I2, the operation processing unit 12 searches the movable object from the monitoring images I1, I2 to set a reference point, so as to obtain a position and/or a motion track of the moving object 18. Then, step 502 is executed that the operation processing unit 12 calculates a transforming parameter of the first coordinate system of the first monitoring image I1 relative to the second coordinate system of the second monitoring image I2. For example, an offset, a scaling ratio and/or a rotary view angle of any feature of the first coordinate system relative to the corresponding feature of the second coordinate system. Step 504 and step 506 are executed to compare the transforming parameters generated by step 502 with the threshold to acquire a value of the reliability level, and a final transforming parameter is determined in accordance with the reliability level. Eventually, step 508 is executed that the operation processing unit 12 utilizes the final transforming parameter finally decided to stitch the first monitoring image I1 and the second monitoring image I2 respectively captured by the image capturing unit 14A and the image capturing unit 14B, so as to form the stitching image I3. The user can identify conditions inside the whole monitoring range of the camera system 10 via the stitching image I3.

Generally, the image stitching method of the present invention utilizes the moving object 18 inside the overlapped monitoring region 16C to calculate the transforming parameter, and further captures a set of new first monitoring image I1 and new second monitoring image I2 while the moving object is not located inside the monitoring range of the image capturing units 14A, 14B. The newly captured monitoring images I1, I2 do not have the moving object (such like a passerby), and the image stitching method can use the newly captured monitoring images I1, I2 to manufacture the stitching image I3 (the stitching image I3 may show a background of the stitching monitoring range). The image stitching method further can manufacture the stitching image I3 while the moving object 18 stays inside the first monitoring image I1 and the second monitoring image I2, which depends on actual demand.

Figure 6:
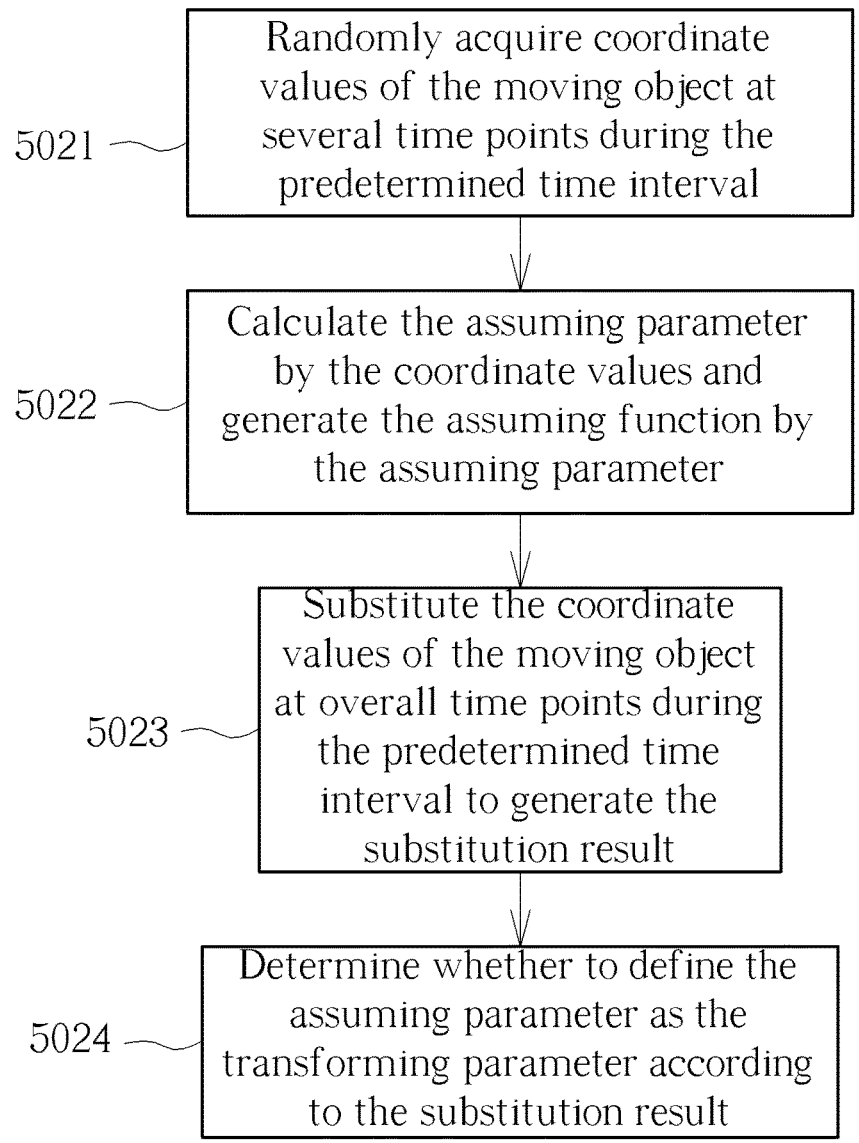
FIG. 6 is a flow chart of acquiring the transforming parameter by the image stitching method according to the embodiment of the present invention.

Please refer to FIG. 6. FIG. 6 is a flow chart of acquiring the transforming parameter by the image stitching method according to the embodiment of the present invention. In movement of the moving object 18, the operation processing unit 12 randomly acquires coordinate values of the moving object 18 within the first coordinate system and the second coordinate system at one or more time points during at least one predetermined time interval (step 5021), the said coordinate values are used to calculate an assuming parameter and the assuming parameter is used to generate the corresponding assuming function (step 5022). In the meanwhile, the assuming function cannot be utilized to execute the coordinate value transformation between the first coordinate system and the second coordinate system. Therefore, the operation processing unit 12 substitutes the coordinate values of the moving object 18 at overall time points during the predetermined time interval to generate a plurality of substitution results (step 5023). A period of the moving object 18 staying inside the overlapped monitoring region 16C can be divided into a plurality of predetermined time intervals. The assuming function which has a maximal amount of the substitution result conforming to the said assuming function can be interpreted as the proper assuming function. Final, in accordance with the substitution result, the assuming parameter corresponding to the said substitution result can be regarded as the transforming parameter (step 5024). It is to say, while step 5024 is executed, the image stitching method looks for the assuming parameter having the maximal amount of the substitution result within the allowed range, the foresaid assuming parameter has greater correct probability and can be used as the transforming parameter. In one embodiment, while a plurality of moving objects 18 is located inside the overlapped monitoring region 16C, the transforming parameter can be determined as in use by generating at least one substitution result of each moving object 18. While the overlapped monitoring region 16C has the single one moving object 18, the period of the moving object 18 staying inside the overlapped monitoring region 16C can be divided into the plurality of predetermined time intervals, and each predetermined time interval can generate at least one substitution result to determine the adopted transforming parameter. Moreover, transformation between the first coordinate system and the second coordinate system can be processed by conventional linear conversion formula, and a detailed description is omitted herein for simplicity.

Figure 7:
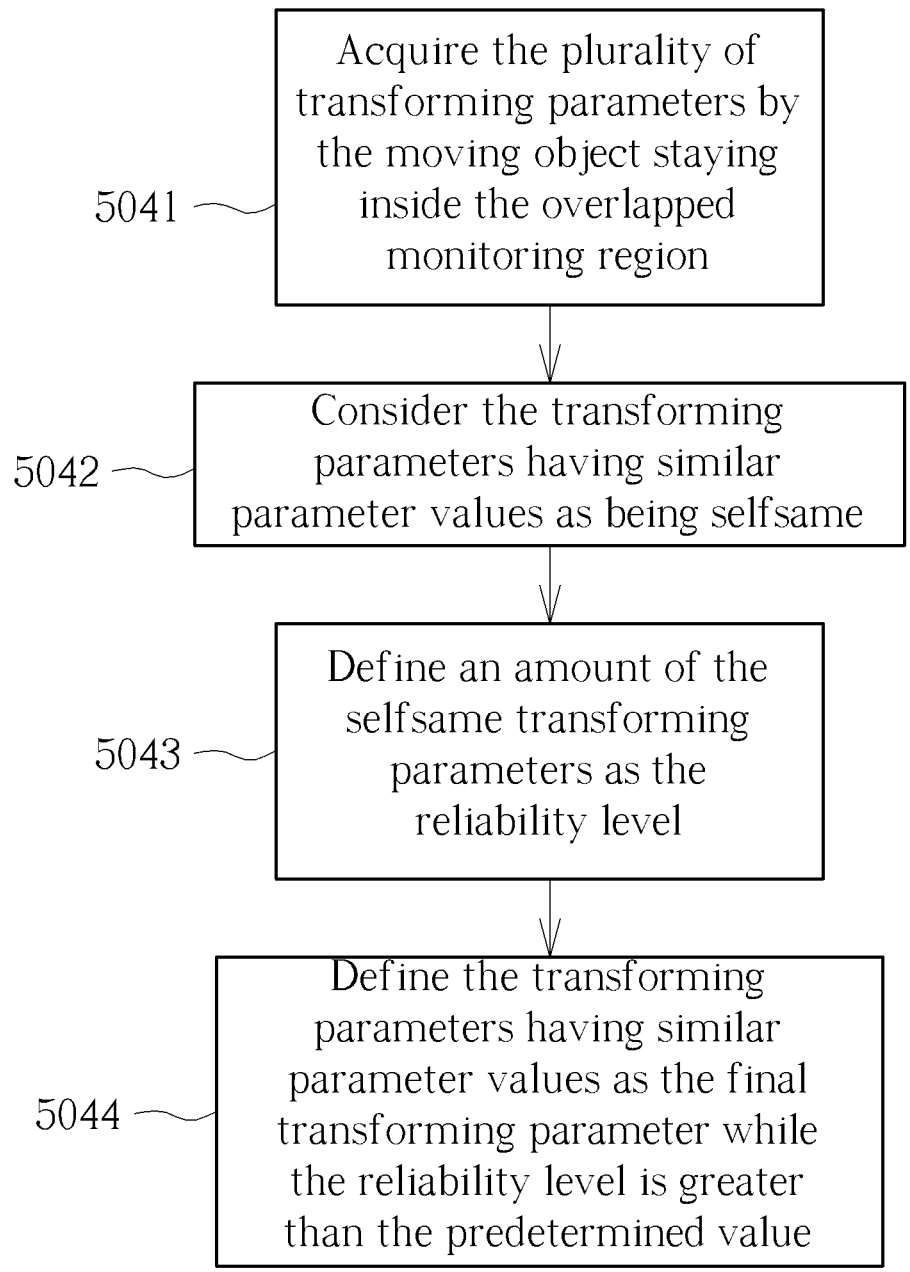
FIG. 7 is a flow chart of acquiring the final transforming parameter by the image stitching method according to the embodiment of the present invention.

Please refer to FIG. 1 and FIG. 7. FIG. 7 is a flow chart of acquiring the final transforming parameter by the image stitching method according to the embodiment of the present invention. The operation processing unit 12 executes step 5041 to acquire the plurality of transforming parameters by the moving object 18 staying inside the overlapped monitoring region 16C contained within the monitoring regions 16A, 16B overlapped with each other. The transforming parameter becomes more accurate in accordance with large numbers of the moving object 18 and the transforming parameter. Because the transforming parameters may not be completely identical with each other, step 5042 is executed that the operation processing unit 12 considers the transforming parameters as being selfsame since difference between the foresaid transforming parameters is lower than the threshold. Then, step 5043 is executed to define an amount of the selfsame transforming parameters interpreted in step 5042 as a value of the reliability level by the operation processing unit 12. For example, the amount of the selfsame transforming parameters interpreted in step 5042 can be directly used as the reliability level, or the amount of the selfsame transforming parameters interpreted in step 5042 is transformed into the reliability level by specific manners, which depends on design demand. Eventually, step 5044 is executed that the foresaid transforming parameters having similar parameter values are used to define the final transforming parameter while the reliability level is greater than the predetermined value; for instance, the predetermined value is set as ten, there are ten transforming parameters that has similar parameter values and difference between the similar parameter values is smaller than the threshold are searched by step 5042, and one of the ten transforming parameters can be defined as the final transforming parameter, or an average of some of the ten transforming parameters can be defined as the final transforming parameter, or an average of the all transforming parameters can be defined as the final transforming parameter. Variation of calculating the final transforming parameter is not limited to the above-mentioned embodiments.

The image stitching method of the present invention utilizes variation of the final transforming parameter (which can be represented as the final transforming parameter) to calculate relation between the first coordinate system and the second coordinate system, for stitching the first monitoring image I1 and the second monitoring image I2 to form the stitching image I3 shown in FIG. 4. The first monitoring image I1 and the second monitoring image I2 respectively contain the monitoring regions 16A, 16B can be stitched up to provide the integrated stitching image I3. In one embodiment, the final transforming parameter is optionally utilized to adjust the offset, the scaling ratio and/or the rotary view angle of the first monitoring image I1 relative to the second monitoring image I2 to stitch up and to manufacture the stitching image I3.

In addition, for improving efficiency of the stitching image I3 and preventing image dislocation, the present invention may execute the following image stitching enhancement process while the first monitoring image I1 is stitched with the second monitoring image I2: searching feature points or straight baselines between the first monitoring image I1 and the second monitoring image I2 to manufacture the stitching image I3. As shown in FIG. 3 and FIG. 4, the image stitching method can search the feature points from the first monitoring image I1 and the second monitoring image I2 to calculate a tangent line, and the feature point can be, but not limited to, any block with specific color, shape and dimension within the monitoring images. Then, the image stitching method utilizes the final transforming parameter acquired in step 506 to stitch the first monitoring image I1 and the second monitoring image I2 along the tangent line to form the stitching image I3 shown in FIG. 4, so the stitching image I3 can be enhanced accordingly by the above-mentioned manners. The tangent line can be an irregular line and not be shown in figures. Besides, the image stitching method may search the first straight baseline L1 and the second straight baseline L1 from the first monitoring image I1 and the second monitoring image I2. A connective line between the wall and the floor shown in figures can be interpreted as the straight baseline, and application of the connective line is not limited to the above-mentioned embodiment. Then, the final transforming parameter is utilized to obtain the transforming parameter variation of the first straight baseline L1 relative to the second straight baseline L2, so as to acquire the relation between the first coordinate system and the second coordinate system. The stitching image I3 can be adjusted in accordance with variation of the final transforming parameter for the image stitching enhancement process.

In one embodiment, the user can simultaneously observe details inside the first monitoring image I1 and the second monitoring image I2 captured by the two image capturing units 14A, 14B via watching the stitching image I3. In another embodiment, the user may issue a command (such as drawing the line, selecting the object or marking the object) to the camera system 10 through the stitching image I3 (which is a panoramic image combined the first monitoring image I1 with the second monitoring image).

In conclusion, the image stitching method and the camera system with the image stitching function of the present invention dispose the two image capturing units adjacent to each other by letting the monitoring regions overlapped, the coordinate values of the moving object (which can be represented as a reference point) inside the overlapped monitoring region are utilized to calculate and generalize the final transforming parameter mostly suitable for transformation between the two coordinate systems, and the monitoring images respectively captured by the two image capturing units are stitched up via the final transforming parameter to provide the panoramic stitching image. The stitching image further can be enhanced by the manners of utilizing the feature point or the straight baseline to increase stitching accuracy, and the user can conveniently issue the command over the stitching image by visual observation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image stitching method applied to two image capturing units respectively having a first coordinate system and a second coordinate system, the two image capturing units having monitoring regions adjacent to each other and an overlapped monitoring region being formed by the said monitoring regions, the image stitching method comprising:
   detecting at least one moving object within the overlapped monitoring region;
   calculating at least one transforming parameter of the first coordinate system relative to the second coordinate system;
   utilizing the at least one moving object within the overlapped monitoring region to acquire a plurality of transforming parameters;
   setting some of the plurality of transforming parameters having similar parameter values as being selfsame;
   defining an amount of the said selfsame transforming parameters as a reliability level;
   determining one of the said selfsame transforming parameters or an average of some of the said selfsame transforming parameters as the final transform parameter in accordance with the reliability level;

searching feature points on the first monitoring image and the second monitoring image respectively captured by the two image capturing units to calculate a tangent line; and utilizing the final transform parameter to stitch monitoring images respectively captured by the two image capturing units along the tangent line.

2. The image stitching method of claim 1, wherein the at least one transforming parameter is selected from a group consisting of an offset, a scaling ratio, a rotary view angle between the first coordinate system and the second coordinate system, and combination thereof.

3. The image stitching method of claim 2, wherein a step of utilizing the final transform parameter to stitch the monitoring images respectively captured by the two image capturing units is: utilizing the final transform parameter to optionally adjust the offset, the scaling ratio and/or the rotary view angle of a first monitoring image so as to stitch with a second monitoring image.

4. The image stitching method of claim 3, wherein a step of utilizing the final transform parameter to stitch the monitoring images respectively captured by the two image capturing units comprises:

searching a first straight baseline and a second straight baseline respectively from the first monitoring image and the second monitoring image captured by the two image capturing units;

utilizing the final transform parameter to acquire variation of the final transform parameter of the first monitoring image relative to the second monitoring image; and stitching the first monitoring image and the second monitoring image in accordance with the said variation of the final transform parameter.

5. The image stitching method of claim 1, wherein the two image capturing units are triggered to simultaneously capture the monitoring images containing the at least one moving object within the overlapped monitoring region.

6. The image stitching method of claim 1, wherein a step of calculating the at least one transforming parameter of the first coordinate system relative to the second coordinate system comprises:

acquiring coordinate values of the at least one moving object randomly at several time points during at least one predetermined time interval;

calculating an assuming parameter by the coordinate values;

generating an assuming function via the assuming parameter;

generating at least one substitution result by substituting the coordinate values of the at least one moving object at whole time points during the at least one predetermined time interval for the assuming function; and determining whether the assuming parameter corresponding to the at least one substitution result is regarded as the at least one transforming parameter in accordance with the at least one substitution result.

7. The image stitching method of claim 6, wherein a period of the at least one moving object staying in the overlapped monitoring region is divided into a plurality of predetermined time intervals.

8. The image stitching method of claim 6, wherein a step of determining whether the assuming parameter corresponding to the at least one substitution result is regarded as the at least one transforming parameter in accordance with the at least one substitution result is: defining the assuming parameter having a maximal amount of the substitution results within an allowed range as the at least one transforming parameter.

9. The image stitching method of claim 1, wherein while the reliability level is greater than a predetermined value, some of the plurality of transforming parameters having the similar parameter values are utilized to define the final transform parameter.

10. A camera system with an image stitching function, having an operation processing unit and two image capturing units electrically connected with each other, the two image capturing units respectively having a first coordinate system and a second coordinate system, the two image capturing units having monitoring regions adjacent to each other and an overlapped monitoring region being formed by the said monitoring regions, the operation processing unit being utilized to detect at least one moving object within the overlapped monitoring region, to calculate at least one transforming parameter of the first coordinate system relative to the second coordinate system, to utilize the at least one moving object within the overlapped monitoring region to acquire a plurality of transforming parameters, to set some of the plurality of transforming parameters having similar parameter values as being selfsame, to define an amount of the said selfsame transforming parameters as a reliability level, to determine one of the said selfsame transforming parameters or an average of some of the said selfsame transforming parameters as the final transform parameter in accordance with the reliability level, to search feature points on the first monitoring image and the second monitoring image respectively captured by the two image capturing units to calculate a tangent line, and to utilize the final transform parameter to stitch monitoring images respectively captured by the two image capturing units along the tangent line.

11. The camera system of claim 10, wherein the at least one transforming parameter is selected from a group consisting of an offset, a scaling ratio, a rotary view angle between the first coordinate system and the second coordinate system, and combination thereof.

12. The camera system of claim 11, wherein the operation processing unit is adapted to utilize the final transform parameter to optionally adjust the offset, the scaling ratio and/or the rotary view angle of a first monitoring image so as to stitch with a second monitoring image while utilizing the final transform parameter to stitch the monitoring images respectively captured by the two image capturing units.

13. The camera system of claim 12, wherein the operation processing unit is adapted to search a first straight baseline and a second straight baseline respectively from the first monitoring image and the second monitoring image captured by the two image capturing units, to utilize the final transform parameter to acquire variation of the final transform parameter of the first monitoring image relative to the second monitoring image, and to stitch the first monitoring image and the second monitoring image in accordance with the said variation of the final transform parameter while utilizing the final transform parameter to stitch the monitoring images respectively captured by the two image capturing units.

14. The camera system of claim 10, wherein the operation processing unit is adapted to acquire coordinate values of the at least one moving object randomly at several time points during at least one predetermined time interval, to calculate an assuming parameter by the coordinate values, to generate an assuming function via the assuming parameter, to generate at least one substitution result by substituting the coordinate values of the at least one moving object at whole time points during the at least one predetermined time interval for the assuming function, and to determine whether the assuming parameter corresponding to the at least one substitution result is regarded as the at least one transforming parameter in accordance with the at least one substitution result while calculating the at least one transforming parameter of the first coordinate system relative to the second coordinate system.

15. The camera system of claim 14, wherein the operation processing unit is adapted to define the assuming parameter having a maximal amount of the substitution results within an allowed range as the at least one transforming parameter while determining whether the assuming parameter corresponding to the at least one substitution result is regarded as the at least one transforming parameter in accordance with the at least one substitution result.

16. The camera system of claim 10, wherein while the reliability level is greater than a predetermined value, some of the plurality of transforming parameters having the similar parameter values are utilized to define the final transform parameter.

* * * * *